(12) United States Patent
Qvarfordt et al.

(10) Patent No.: US 8,243,116 B2
(45) Date of Patent: Aug. 14, 2012

(54) METHOD AND SYSTEM FOR MODIFYING NON-VERBAL BEHAVIOR FOR SOCIAL APPROPRIATENESS IN VIDEO CONFERENCING AND OTHER COMPUTER MEDIATED COMMUNICATIONS

(75) Inventors: Pernilla Qvarfordt, Los Altos, CA (US); Gene Golovchinsky, Menlo Park, CA (US); Maribeth Joy Back, Woodside, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 1359 days.

(21) Appl. No.: 11/860,350

(22) Filed: Sep. 24, 2007

(65) Prior Publication Data

US 2009/0079816 A1 Mar. 26, 2009

(51) Int. Cl.
*H04N 7/14* (2006.01)
(52) U.S. Cl. .................................. 348/14.01; 348/14.08
(58) Field of Classification Search ............... 348/14.01, 348/14.02, 14.04, 14.05, 14.07, 14.08, 14.1, 348/14.11, 14.15
See application file for complete search history.

(56) References Cited

FOREIGN PATENT DOCUMENTS
WO WO 99/57900 * 11/1999

OTHER PUBLICATIONS

Barrientos, Francesca, "Continuous Control of Avatar Gesture," Proceedings of the 2000 ACM Workshops on Multimedia, ACM Press, Los Angeles, CA, USA, pp. 5-8 (2000).
Busso, Carlos, et al., "Analysis of Emotion Recognition Using Facial Expressions, Speech and Multimodal Information," Proceedings of the 6th International Conference on Multimodal Interfaces, ICMI '04, ACM Press, State College, PA, USA, pp. 205-211 (2004).
Colburn, R. Alex, et al., "The Role of Eye Gaze in Avatar Mediated Conversational Interfaces," Microsoft Research Report 81, 10 pages. (2000).
Dubnov, Shlomo, et al., "Media Flow Experience Using Influential Feature Analysis," 4 pages.
Garau, Maia, et al., "The Impact of Avatar Realism and Eye Gaze Control on Perceived Quality of Communication in a Shared Immersive Virtual Environment," Proceedings of Conference on Human Factors in Computing Systems, CHI 2001, Fort Lauderdale, FL, USA ACM Press, pp. 259-266 (2003).
Garau, Maia, et al., "The Impact on Eye Gaze on Communication Using Humanoid Avatars," Proceedings of Conference on Human Factors in Computing Systems, CHI 2003, Seattle, WA, USA, ACM Press, pp. 309-316 (2001).

(Continued)

*Primary Examiner* — Suhan Ni
(74) *Attorney, Agent, or Firm* — Morgan, Lewis & Bockius LLP

(57) ABSTRACT

A method is described for modifying behavior for social appropriateness in computer mediated communications. Data can be obtained representing the natural non-verbal behavior of a video conference participant. The cultural appropriateness of the behavior is calculated based on a cultural model and previous behavior of the session. Upon detecting that the behavior of the user is culturally inappropriate, the system can calculate an alternative behavior based on the cultural model. Based on this alternative behavior, the video output stream can be modified to be more appropriate by altering gaze and gesture of the conference participants. The output stream can be modified by using previously recorded images of the participant, by digitally synthesizing a virtual avatar display or by switching the view displayed to the remote participant. Once the user's behavior changes to be once again culturally appropriate, the modified video stream can be returned to unmodified state.

19 Claims, 6 Drawing Sheets

OTHER PUBLICATIONS

Gemmell, Jim, et al., "Gaze Awareness for Video-Conferencing: A Software Approach," IEEE Multimedia, pp. 26-35 (Oct.-Dec. 2000).

Jerald, Jason, et al., "Eye Gaze Correction for Videoconferencing," Proceedings of Symposium on Eye Tracking Research & Applications, ACM Press, pp. 77-81 (2002).

Johnson, W. Lewis, et al., "Tactical Language Training System: Supporting the Rapid Acquisition of Foreign Language and Cultural Skills," Proceedings of the Proceedings of inSTIL/ICALL2003-NLP and Speech Technologies in Advanced Language Learning Systems, Venice, Italy, 4 pages (2004).

Kim, San Woon, et al., "Generation of Arm-Gesture and Facial Expression for Intelligent Avatar Communications on the Internet," 6 pages (2002).

McCarthy, Anjanie, et al., "Cultural Display Rules Drive Eye Gaze During Thinking," Journal of Cross-Cultural Psychology, vol. 37, No. 6, pp. 171-722 (Nov. 2006).

Nguyen, David, et al., "MultiView: Spatially Faithful Group Video Conferencing," Proceedings of Proceedings of the SIGCHI Conference on Human Factors in Computing Systems, Portland, OR, USA, ACM Press, pp. 799-808 (2005).

Schneiderman, Henry, et al., "A Statistical Model for 3D Object Detection Applied to Faces and Cars," Proceedings of IEEE Conference on Computer Vision and Pattern Recognition, 6 pages (2000).

Sebe, Nicu, et al., "Emotion Recognition Based on Joint Visual and Audio Cues," Proceedings of the $18^{th}$ International Conference on Pattern Recognition (ICPR'06), pp. 1136-1139 (2006).

Taylor, Michael J., et al., "Gaze Communication Using Semantically Consistent Spaces," Proceedings of Conference on Human Factors in Computing Systems, CHI 2000, The Hague, The Netherlands, ACM Press, pp. 400-407 (2000).

Tsalakanidou, Filareti, et al., "Face Localization and Authentication Using Color and Depth Images," IEEE Transactions on Image Processing, vol. 14, No. 2, pp. 152-168 (Feb. 2005).

Vertegaal, Roel, et al., "Eye Gaze Patterns in Conversations: There is More to Conversational Agents than Meets the Eyes," Proceedings of Conference on Human Factors in Computing Systems, CHI 2001, Seattle, WA, USA, ACM Press, pp. 301-309 (2001).

Vertegaal, Roel, et al., "The GAZE Groupware System: Mediating Joint Attention in Multiparty Communication and Collaboration," Proceedings of Conference on Human-Factors in Computing Systems, CHI 1999, Pittsburgh, PA, USA, ACM Press, pp. 294-301 (1999).

Zeng, Zhihong, et al., "Audio-Visual Emotion Recognition in Adult Attachment Interview," Proceedings of the $8^{th}$ International Conference on Multimodal Interfaces, ICMI '06, ACM Press, Banff, Alberta, Canada, pp. 139-145 (2006).

\* cited by examiner

METHOD AND SYSTEM FOR MODIFYING NON-VERBAL BEHAVIOR FOR SOCIAL APPROPRIATENESS IN VIDEO CONFERENCING AND OTHER COMPUTER MEDIATED COMMUNICATIONS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The current invention relates generally to video conferencing and other computer mediated communications and more particularly to modifying non-verbal user behavior for social appropriateness within video conferencing sessions.

2. Description of the Related Art

In recent years, video teleconferencing and other forms of computer mediated communications have become increasingly popular among various organizations, businesses and general consumers. In addition to transmitting two-way video and audio between users in different locations, video conferencing is also used to share files and documents in real-time, provide electronic whiteboards, represent participants as virtual three-dimensional avatars, conduct business meetings and common conversations, and perform a variety of other tasks. All of this functionality has resulted in a significant impact on business, technology, education and the general quality of life for a substantial portion of society.

Video conferencing and analogous technologies have also played a substantial role in opening up lines of communications between people in different geographical areas, cultures and languages. Along with it, however, came a plethora of various issues and concerns in the online behavior among conference participants, which did not previously exist in other mediums of communication. For example, because video teleconferencing software typically carries a video transmission signal of its participants, the non-verbal behavior of users has now become of significance. The appropriateness of such non-verbal behavior can vary greatly across different cultures and what is viewed as being appropriate in one culture is often seen as improper in another.

In business meetings, appropriateness of the participants' non-verbal behavior can be crucial. For example, non-verbal behavior plays a surprisingly important role for building trust between people. The right amount of gaze at the right time, appropriate gestures and facial expressions can portray trust and can make a deal succeed or fail. Although it is possible for an ordinary person to learn appropriate non-verbal behavior of a different culture, maintaining appropriateness beyond certain formalized acts, such as greetings, can be quite complicated. Furthermore, requiring the participant to learn the customs and traditions of each culture in any meeting he or she may attend is often very difficult, may require various training systems and in many cases may be altogether undesirable.

Related art in using gaze or gesture has mainly focused on using aggregated information in the form of gaze or gesture models that are related to the status of the conversation. These models are later used for generating gaze or gesture output for a completely automated avatar to mimic the natural behavior in a conversation (e.g. See Colburn, et al. "The Role of Eye Gaze in Avatar Mediated Conversational Interfaces" *Microsoft Research Report*, 81.2000.2000.; Garau, et al. "The Impact on Eye Gaze on Communication Using Humanoid Avatars" In *Proceedings of Conference on Human Factors in Computing Systems*, Seattle, Wash., (2001), ACM Press, pp. 309-316; and Garau, et al. "The Impact of Avatar Realism and Eye Gaze Control on Perceived Quality of Communication in a Shared Immersive Virtual Environment" In *Proceedings of Conference on Human Factors in Computing Systems*, Fort Lauderdale, Fla., (2003), ACM Press, pp. 259-266).

Eye input for video conferencing has also been used to increase the gaze awareness of the participants, such as to determine who is looking at whom. Gaze input or knowledge about the gaze in this setting is used for overcoming the parallax due to the offset between the video image and the camera position in the physical set up of the video conferencing equipment. Some systems modify the area around the eyes in the video image to compensate for the parallax. Others use information about the user's gaze to change the rotation of images or of video displays of participants to indicate who in the conversation is looking at whom. (e.g. See Gemmel et al. "Gaze Awareness for Video Conferencing: A Software Approach" *IEEE Multimedia* (October-December) 2000 pp. 26-35; Jerald, et al. "Eye Gaze Correction for Video Conferencing" In *Proceedings of Symposium on Eye Tracking Research & Applications* (2002) ACM Press pp. 77-81; Taylor, et al. "Gaze Communication Using Semantically Consistent Spaces" In *Proceedings of Conference on Human-Factors in Computing Systems* (The Hague, Netherlands, 2000) ACM Press pp. 400-407; Vertegaal, R., "The GAZE Groupware System: Mediating Joint Attention in Multiparty Communication and Collaboration" In *Proceedings of Conference on Human Factors in Computing Systems* (CHI'99), (Pittsburgh, Pa., USA, 1999), ACM Press pp. 294-301; Vertegaal, et al. "Eye Gaze Patterns in Conversations: There is More to Conversational Agents Than meets the Eyes" In *Proceedings of Conference on Human Factors in Computing Systems* CHI, (Seattle, Wash., USA, 2001), ACM Press, pp. 301-309; and Vertegaal, et al. "Conveying Eye Contact in Group Video Conferencing Using Eye-Controlled Camera Direction" In *Proceedings of Conference on Human Factors in Computing Systems*, (Fort Lauderdale, Fla., USA, 2003), ACM Press pp. 521-528).

Some conferencing systems have been described which represent users as virtual or three-dimensional avatars. In such systems, the illustration of physical and non-verbal gestures and gazes of such avatars is usually not tailored to any particular user or culture and may often be misunderstood and misinterpreted by the viewer. Even in systems that do use some cultural parameters, such parameters are usually limited to completely automated avatars. For example, some systems have generated culturally-specific or culturally-independent gestures in completely automated avatars (e.g. See "Johnson, et al., "Tactical Language Training System: Supporting the Rapid Acquisition of Foreign Language and Cultural Skills" In *Proceedings of InSTIL/ICALL2004-NLP and Speech Technologies in Advanced Language Learning Systems*—Venice (2004) p. 19; and Kim, et al. "Generation of Arm-gesture and Facial Expression for Intelligent Avatar Communications on the Internet (2002)).

Other systems have been described which control an avatar with hand movements. In general, these hand movements are not natural gestures, rather the hand is used as a replacement of a mouse or other input techniques (e.g. See Barrientos, F. "Continuous control of avatar gesture" *Proceedings of the*

2000 *ACM workshops on Multimedia*, ACM Press, Los Angeles, Calif., U.S., 2000, 5-8). Additionally, such avatar control has not addressed the desire to tailor behavior to culturally specific parameters, as previously discussed.

In light of all of the foregoing, there exists a need for a system which would be able to modify and remap the natural behaviors of meeting participants to more culturally appropriate behaviors, adapt virtual environment avatar appearance to meet cultural expectations of the avatar's viewer and use naturally occurring behavior rather than deliberate control grammars to achieve culturally appropriate communications. Applicants have identified these, as well as other issues and concerns that exist in the art in coming to conceive the subject matter of the present application.

SUMMARY OF THE INVENTION

In embodiments, methods and systems are presented for modifying behavior for social appropriateness in computer mediated communications. Data can be obtained representing the natural non-verbal behavior of a video conference participant. The cultural appropriateness of the behavior is calculated based on a cultural model and previous behavior of the session. Upon detecting that the behavior of the user is culturally inappropriate, the system can calculate an alternative behavior based on the cultural model. Based on this alternative behavior, the video output stream can be modified to be more appropriate by altering gaze and gesture of the conference participants. The output stream can be modified by using previously recorded images of the participant, by digitally synthesizing a virtual avatar display or by switching the view displayed to the remote participant. Once the user's behavior changes to be once again culturally appropriate, the modified video stream can be returned to unmodified state.

BRIEF DESCRIPTION OF THE DRAWINGS

Preferred embodiment(s) of the present invention will be described in detail based on the following figures, wherein.

DETAILED DESCRIPTION

Figure 1:
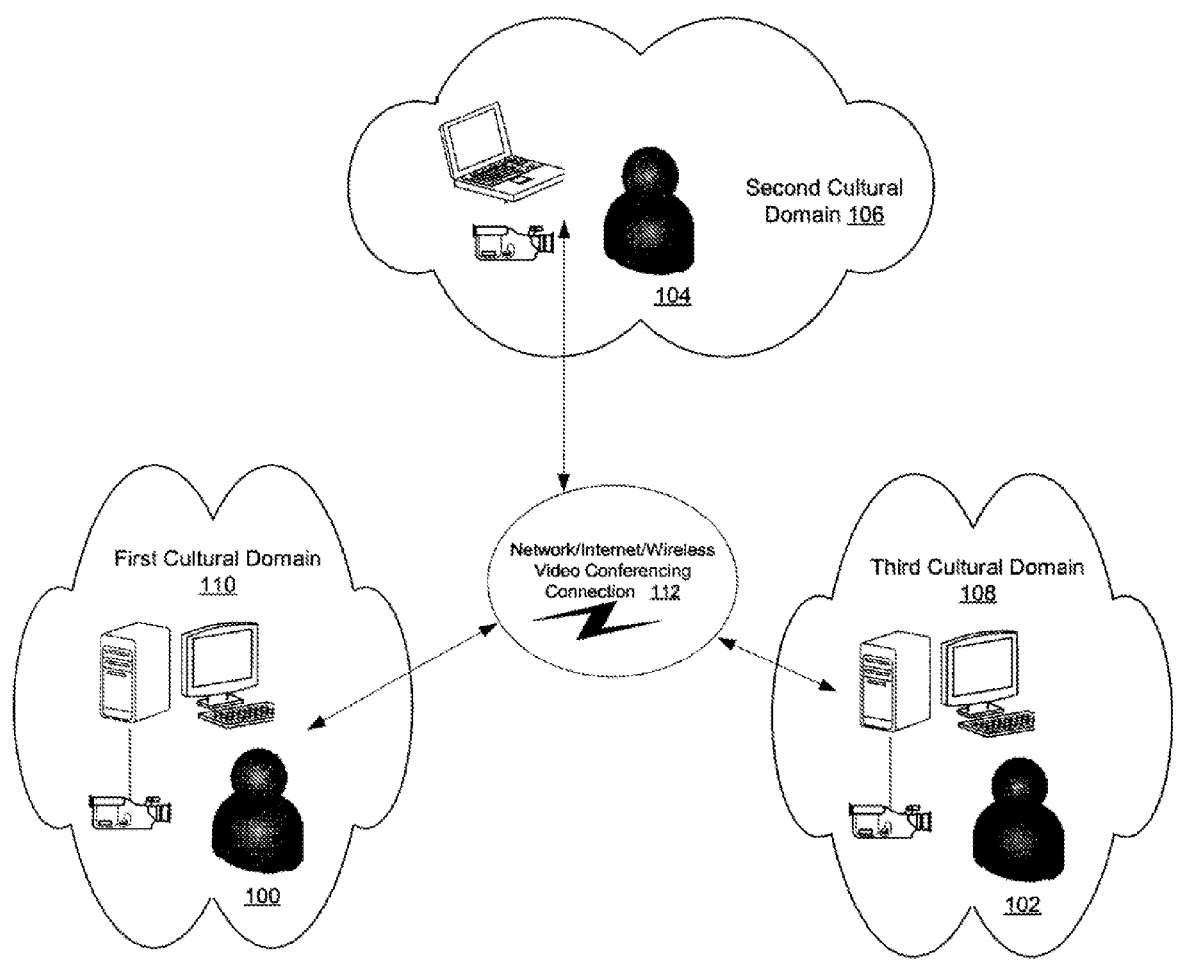
FIG. 1 is an exemplary illustration of various devices and components within the context of various embodiments.

The invention is illustrated by way of example and not by way of limitation in the figures of the accompanying drawings in which like references indicate similar elements. References to embodiments in this disclosure are not necessarily to the same embodiment, and such references mean at least one. While specific implementations are discussed, it is understood that this is done for illustrative purposes only. A person skilled in the relevant art will recognize that other components and configurations may be used without departing from the scope and spirit of the invention.

In the following description, numerous specific details are set forth to provide a thorough description of the invention. However, it will be apparent to those skilled in the art that the invention may be practiced without these specific details. In other instances, well-known features have not been described in detail so as not to obscure the invention.

Although a diagram may depict components as logically separate, such depiction is merely for illustrative purposes. It can be apparent to those skilled in the art that the components portrayed can be combined or divided into separate software, firmware and/or hardware components. Furthermore, it can also be apparent to those skilled in the art that such components, regardless of how they are combined or divided, can execute on the same computing device or can be distributed among different computing devices connected by one or more networks or other suitable communication mediums.

In accordance with the embodiments, systems and methods are described for modifying non-verbal behavior of video conferencing users for social appropriateness purposes. In one embodiment, the system comprises a video teleconferencing system that serves multiple users or meeting participants. The video teleconferencing system can include both software or hardware systems and can preferably be implemented as a software application deployed on a server or client computing device which is able to establish a connection to the internet. In various embodiments, the system also includes an image capturing device such as a digital or video camera.

The conferencing system can be used to record video image data of the user's behavior for transmission and/or display to the other conference participants. In various embodiments, a video analysis can be conducted on the captured video image data in order to determine the cultural appropriateness of the user's natural non-verbal behavior. The analysis can be based on a cultural model and can analyze any combination of the gaze, gesture, timing, emphasis and emotional data of the user's non-verbal behavior. In alternative embodiments, the verbal behavior can also be analyzed according to the cultural model. If the behavior is deemed inappropriate, the cultural model data can also be used to determine an alternative behavior for the user, one which would better fit the circumstances of the video conference.

If the behavior is inappropriate, the visual output stream can be modified by remapping the natural behavior of the participant to match the alternative more appropriate behavior. This modification can be conducted in several different ways. For example, the conferencing system can alter the gaze and/or gesture of the user recorded by the image capture device prior to displaying the data or transmitting the data to the other meeting participants. In one embodiment, the system can store calibrated image data of the user's eye portion, which can be extracted and used to modify the eye image portion of the video image data in accordance with the alternative behavior. As an illustration, if the system determines that, according to the cultural model, it would be more appropriate for the user to be gazing down instead of looking up, the eye portion of the user's video image can be replaced with a pre-recorded calibrated image of the user's eyes gazing downward. In another embodiment, upon detecting inappropriate behavior, the system can switch from the view of the user to a shared view of the presentation, such as documents, charts, graphs or the like. Yet in other embodiments, such as where the system uses virtual display avatars to represent the participants, the system can synthesize the displayed avatar's appearance and actions to match the more appropriate behavior.

After a period of time has elapsed, the modified view can be returned to normal, i.e. unmodified video of the user. The appropriate timing to return to the unmodified video can be determined the same way as deciding when to modify the view. For example, when the user's non-verbal behavior is detected to be culturally appropriate again, the unmodified display can be reinstated. In one embodiment, the algorithm can also consider how long a time the alternative visual material has been shown, so as to allow an aesthetic and pleasing video teleconferencing experience. In various embodiments, the user can also be allowed to specify the period of time before reverting to unmodified behavior as a configurable attribute or parameter.

The dynamic ability of the video conferencing system to perform the functions described above allows remapping of the natural behaviors of the users to more culturally or socially appropriate behavior. Additionally, virtual environment avatars can be adjusted in appearance and behavior to meet the cultural expectations of the avatar's viewers. All of this functionality provides a more flexible and pleasing video conferencing experience and allows smoother cultural transitions for business meetings, discussions or training sessions.

It should be noted, however, that the methodologies described herein are not limited to video conferencing and can be used in a variety of other applications. For example, a system of training people with social disabilities or a system that aids persons learning to fit into a new culture can also include the embodiments and techniques described in the present disclosure. In one such training system, the person's gaze can be analyzed during different training scenarios and when the gaze of the trainee is no longer socially acceptable, feedback can be provided to the trainee so that they can become aware of the proper gaze behavior. Similar applications and systems for foreign language students are also possible.

One important and fairly easily measured non-verbal behavior is gaze. By tracking gaze behavior, it is possible for one to determine whether a conversational partner is interested, bored, thoughtful, or if they understand the subject matter of the discussion. Gaze can also be used for regulating turn-taking in a conversation (e.g. see Argyle, et al. "Gaze and Mutual Gaze" Cambridge University Press, Cambridge, 1976, incorporated herein by reference). The role of gaze in communication may be one reason why face-to-face meetings are popular and why video conferences can be a popular complement to face-to-face meetings. However, when the participants in a conversation come from different cultures, gaze-related behavior can give rise to unnecessary complications, since the rules governing gaze in conversation are often culturally dependent. For instance when a person with a western background indicates thinking, he or she may be looking up, while a Japanese person may tend to look down (e.g. see McCarthy, et al. "Cultural Display Rules Drive Eye Gaze During Thinking" *Journal of Cross-Cultural Psychology*, 37 (6). 2006, pp. 77-81, incorporated herein by reference). Other cultural differences in the gaze include the amount of gaze directed to a speaker or a listener, when during an utterance it is appropriate to look at the listener, where it is appropriate to look and the like.

In many cases, participants in a video conference may find it hard to know if their gaze behavior is appropriate or not. One reason for such uncertainty can be the offset between the camera and the image of the remote participants. This offset can make it difficult for the participants to know exactly where their eye gaze appears to look at in the display view of the remote party. In addition, the video image of the remote participant can draw attention, which can make local participants direct more attention to the remote participant than in the case where all participants are in the same room (e.g. a television-watching model of gaze behavior).

In various embodiments, it is possible to track the gaze of the participants in a video conference call. This information, along with any audio data, can be used to in the video conference to modify the gaze to be culturally appropriate. For example, in one embodiment, when a Japanese person and a Western person talk to each other, the gaze of the Westerner displayed for the Japanese participant is modified to simulate standard polite Japanese gaze behavior, while the Westerner sees the Japanese participant in a Western culturally appropriate manner.

The modification of behavior can implement a variety of methodologies. In one embodiment, if the system includes materials additional to the view of the participants (e.g. shared presentation, document, diagram, etc.), the system can automatically switch from a view of the remote participant in the meeting to a view of the additional materials (e.g. view of the shared presentation) when the participant's behavior becomes culturally inappropriate. In some embodiments, this technique can be preferred for individualized video conference displays such as those described in Nguyen et al. "Multiview: spatially faithful group video conferencing" In *Proceedings of the SIGCHI conference on Human factors in computing systems* (Portland, Oreg., USA, 2005), ACM Press, pp. 799-808, which is incorporated herein by reference.

In another embodiment, the conferencing system can utilize virtual avatars in a two-dimensional or three-dimensional environment. As used in the present disclosure, an avatar is any visual representation of a user, such as in a shared virtual environment. Avatars are generally well known in the art and are often used within the contexts of internet forums, instant messaging systems, video games and the like. The specific choice of appearance and/or movement of the avatar are not essential to this invention and any such appearance and movement can be utilized with the present embodiments.

The avatar and its actions can be synthesized on the display to be more culturally appropriate according to the cultural model data of the system. For example, the gaze of the avatar can be manipulated to be more appropriate according to the customs of a specific culture. Gaze can also be used for controlling the head movements of the avatars since the direction of the gaze can be closely related to the position of the head. By using this feature, the movements of the avatar can be more natural while requiring minimal effort from the user.

One possible advantage of using avatars and three-dimensional virtual environments over actual video of the participant is that more complex non-verbal behaviors, such as gestures, can easily be synthesized to be culturally appropriate. As an illustration, when a Western participant attends a meeting with a Japanese participant, the Westerner's avatar can be displayed as covering its mouth when laughing— behavior that is not usual in the Western culture but appropriate in Japan. While modifying an actual video display of the user to perform such a gesture may be somewhat technologically complex, synthesizing the gesture of an avatar is relatively simple and does not require additional training and programming above and beyond what is typically needed for avatar movement and display. In a similar manner, other gestures that involve substantial body movement can be more easily synthesized via an avatar rather than directly manipulating the video of the user.

It is important to note, however, that avatar use is not required by all embodiments of the present invention and that some non-verbal behavior can be easily manipulated on the actual video of the conference participants. As one example, the system can be calibrated for each user by pre-recording segments of video where that particular user is gazing up, down, sideways and the like. These pre-recorded segments of the user's eyes can later be used by the conferencing system to remap the user's normal behavior in cases where it is deemed inappropriate. Because such small portions of video can be spliced and manipulated without significant interference to the overall video conference, modifying the gaze of the user can be conducive to many situations.

In addition to remapping the behavior, the system can also provide the users with behavioral suggestions beyond gaze and gesture. For example, a suggestion or comment can be provided to a Western user on context within a meeting, such as Japanese politeness behaviors and protocols, business card exchanges, order of introductions and seating arrangements.

FIG. 1 is an exemplary illustration of various devices and components within the context of various embodiments. Although this diagram depicts components as logically separate, such depiction is merely for illustrative purposes. It will be apparent to those skilled in the art that the components portrayed in this figure can be arbitrarily combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication mediums.

As illustrated, the system can encompass a variety of computing and image capture devices, as well as users (100, 102, 104) located in different cultural domains (106, 108, 110) and connected via a network connection 112. The computing devices can include personal computers (PCs), laptops, mainframes, personal digital assistants (PDAs), cellular telephones, and other devices with processing capability. Image capture devices can include digital and analog cameras, video recording devices, and other devices capable of capturing still photographs or moving images. In some embodiments, additional hardware can be utilized such as eye-tracking apparatuses, motion sensors, data gloves, audio capture devices and the like. The connection 112 can be any communication link established between two or more computing devices, including but not limited to local area networks (LANs), wide area networks (WANs) such as the internet, wireless connections (including radio frequency-based, microwave, or infra-red), cellular telephone communications and other electronic communications.

Figure 2:
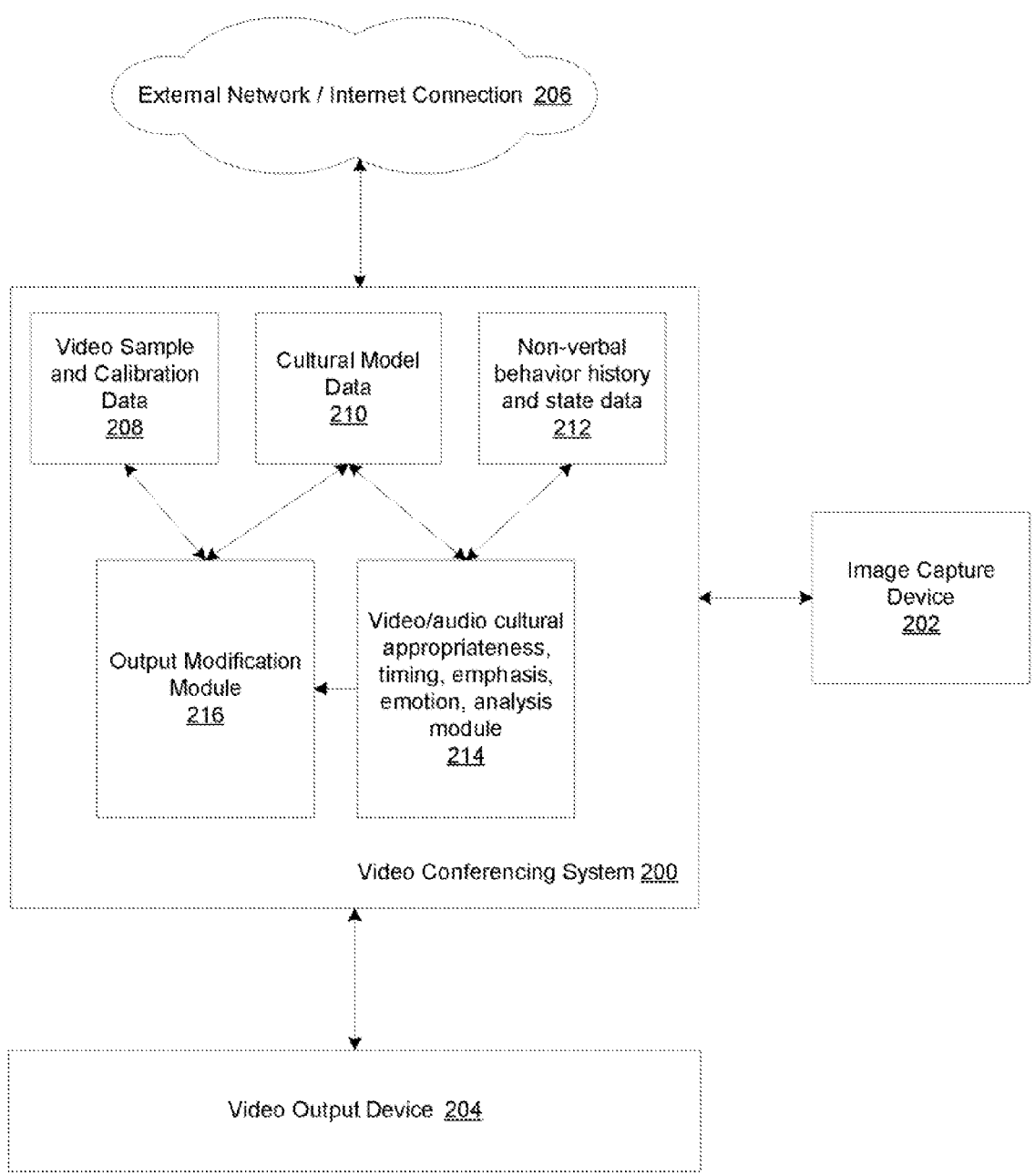
FIG. 2 is an exemplary illustration of a local video conferencing system, in accordance with various embodiments.

FIG. 2 is an exemplary illustration of a local video conferencing system, in accordance with various embodiments. Although this diagram depicts components as logically separate, such depiction is merely for illustrative purposes. It will be apparent to those skilled in the art that the components portrayed in this figure can be arbitrarily combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication mediums.

As illustrated, the video conferencing system 200 can receive video input data from the image capture device 202. In one embodiment, the system includes a video/audio cultural appropriateness module 214, which receives the data from the image capture device 202, and performs a cultural analysis on the data by analyzing the gaze, gesture, timing, emphasis, emotion and other culturally relevant aspects of the user's actions captured on video. The analysis module 214 can utilize the cultural model data 210 and non-verbal behavior history and state data 212 in analyzing the user's behavior. The term module, as used in the present specification can include, but is not limited to compiled software applications, applets, programming objects such as classes and functions and other constructs capable of performing the functionality discussed herein.

In one embodiment, the conferencing system 200 also includes an output modification module 216 that operates in conjunction with the analysis module 214 in order to modify the non-verbal behavior of the user if it is determined to be culturally improper. The output modification module can use the cultural model data 210 and the video sample and calibration data 208 in modifying the behavior.

In various embodiments, the modification of the behavior can consist of modifying the output stream to the video output device 204 and/or to the external network via the internet connection 206. The modification encompasses synthesizing avatar display, manipulating video segments, changing views in the display and other forms of editing the user's behavior.

Figure 3:
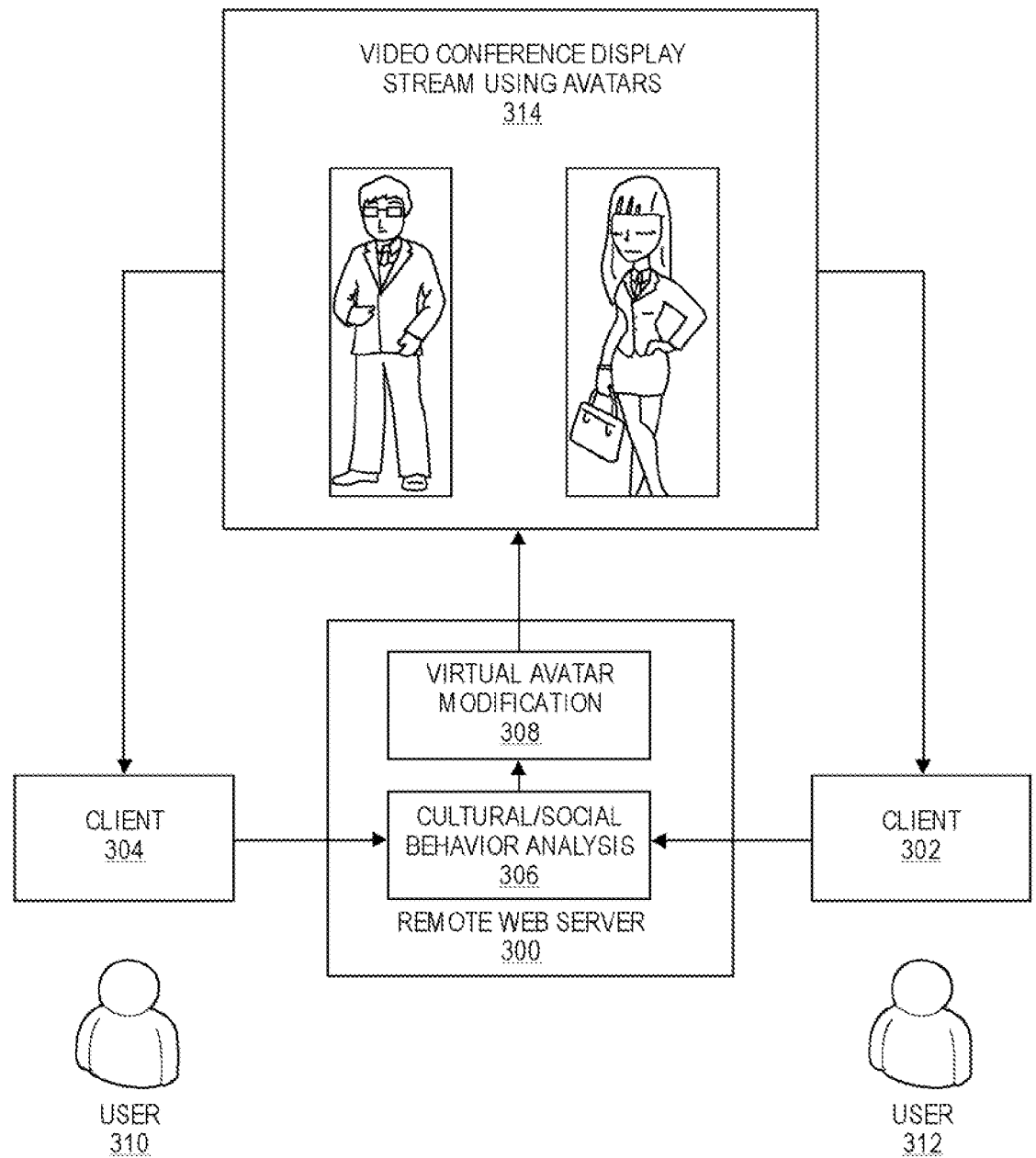
FIG. 3 is an exemplary illustration of a conferencing system utilizing avatar displays, in accordance with various embodiments.

FIG. 3 is an exemplary illustration of a conferencing system utilizing avatar displays, in accordance with various embodiments. Although this diagram depicts components as logically separate, such depiction is merely for illustrative purposes. It will be apparent to those skilled in the art that the components portrayed in this figure can be arbitrarily combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication mediums.

As illustrated, two culturally diverse conference participants 310 and 312 can be logged into client computers 302, 304. A remote web server 300 can provide the functionality for enabling video conferencing via avatar display 314 for the users. Each user can be visually represented in the video conference by his/her respective avatar, which can be customized according to the user's preferences. In one embodiment, the user's natural actions and gestures can be used by the system to control the avatar display. For example if user 310 were to speak, the system can move the lips of the corresponding displayed avatar to indicate which user is speaking. Similarly, when a user raises his hand, moves his head or performs some other action, the avatar motion can be synthesized and displayed respectively.

The remote web server can also provide the functionality for cultural/social behavior analysis 306 and virtual avatar modification 308. Thus, if the particular gesture of the user is deemed inappropriate, the system can ignore that action or can synthesize an alternative action on the avatar, which would better suit the situation. In certain embodiments, this can be made customizable by the participants themselves. For example, many users may wish to remove a yawning gesture from the conference display, since in many cultures this indicates tiredness or boredom. This gesture can be set as a customizable parameter for each user.

It is noted that while the illustration in FIG. 3 shows a remote web server, this component is not necessary to all of the embodiments of the present invention. In many situations, the client computing devices 302, 304 can be in direct communication with each other without any intermediate entity, or alternatively, more than such remote components can be implemented. Furthermore, while, for simplicity, only two users are illustrated, it is generally preferable that the conferencing system be able to handle more than one user at any given conference.

Figure 4A:
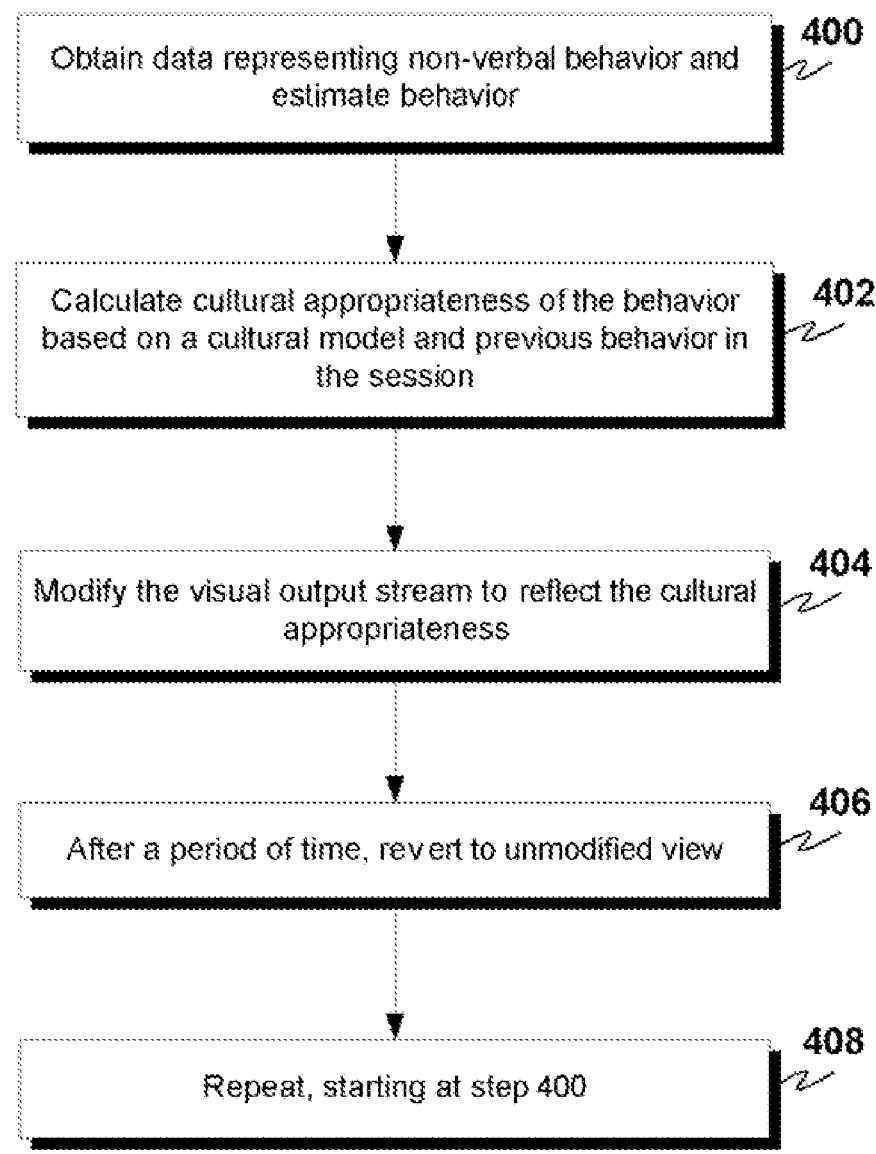
FIG. 4A is a general overview flow chart of a process in accordance with various embodiments.

FIG. 4A is a general overview flow chart of a process in accordance with various embodiments. Although this figure depicts functional steps in a particular sequence for purposes of illustration, the process is not necessarily limited to this particular order or steps. One skilled in the art will appreciate that the various steps portrayed in this figure can be changed, rearranged, performed in parallel or adapted in various ways. Furthermore, it is to be understood that certain steps or sequences of steps can be added to or omitted from this process, without departing from the spirit and scope of the invention.

As shown in step 400, the process can generally begin with obtaining the data representing the non-verbal behavior and determining that behavior. In various embodiments, the first step of the method is to obtain the data from which the non-verbal behavior can be identified. In the gaze embodiments, the data can come from an eye tracking device or from a video image. In the gesture embodiments, the data can be received from a video signal or other instruments to capture a person's motions, such as data gloves or accelerometer. Data gloves are generally known in the art and can be used as an input device for a virtual environment. Data gloves are often accompanied with software to recognize the user's gestures and have been implemented for uses such as recognizing sign language and various entertainment purposes.

Optionally, audio can also be collected along with video for the remote participant. In certain cases, audio can be useful to determine which of the parties is talking. Alternatively, however, this information can be extracted from the video signal. Appropriate behavior often differs depending on whether a person is talking or listening, and on the relative social positions of the participants. Also, laughter and other group actions can be identified from the audio signal. Emotional content can be extracted from the audio analysis as well, such as emphatic vocal stresses in making a strong point, or soothing tones intended to placate. This analysis can help with disambiguation of the appropriate gaze or behavioral representation. More information on this subject can be found in the following references, which are incorporated herein by reference:

Busso, et al. "Analysis of emotion recognition using facial expressions, speech and multimodal information" *Proceedings of the 6th international conference on Multimodal interfaces*, ACM Press, State College, Pa., USA, 2004, pp. 205-211;

Dubnov, et al. "Media Flow Experience using Influential Feature Analysis" http://music.ucsd.edu/~sdubnov/Research/MediaFlowExperience.v3.pdf;

Sebe, et al. "Emotion Recognition based on Joint Visual and Audio Cues" In *Proceedings of 18th International Conference on Pattern Recognition* (ICPR'06) (2006), pp. 1136-1139; and Zeng, et al. "Audio-visual emotion recognition in adult attachment interview" Proceedings of the 8th International conference on Multimodal interfaces, ACM Press, Banff, Alberta, Canada, (2006) pp. 139-145.

In various embodiments, the video signal is used for determining gestures. Gestures can be classified according to a pre-determined system. This can be done with or without manual training. Gaze, on the other hand, can be identified from a video signal or by pulling data from an eye tracker. Independent of the method, the gaze position as it is presented to the remote party is calculated and mapped to an image of the remote party. This mapping allows the algorithm to determine the gaze location.

In step 402, the cultural appropriateness of the behavior can be calculated. When performing this calculation, information from different channels can first be fused into a state representing the current behavior. The cultural appropriateness of the current state, along with the recent history, is calculated based on a cultural model. The model differs depending on the culture. In various embodiments, the cultural model can comprise simple data or a software application. For example, the cultural model can take the form of a textual or an extensible markup language (XML) document that is stored on the video conferencing system.

As an illustration, one cultural model of gaze behavior for native English speakers (English and North Americans) could state that the amount of mutual gaze, i.e. when two participants (speaker and listener) are looking at each other at the same time, should not be more than 40 percent or less than 30 percent of the total conversation time. The duration of mutual gaze should be around 1 second, but not longer than 2 seconds. When listening, a person should look at the speaker around 60-70 percent of the duration of the utterance. When speaking, a person should look at the speaker 30-50 percent of the duration of the utterance. The duration of an utterance can be determined by monitoring the audio channels from the different speaker's locations. Appropriate length of a glance on the conversational partner is 2-3 seconds. It should be noted that this cultural model is provided purely for purposes of illustration and that many different models can be implemented within the scope of the present embodiments.

Additionally, the direction of an averted gaze can be included in the cultural model. Native English speakers should more often glance away upwards or sideways and not downwards. Short downward glances are appropriate if they do not become too frequent or too long (more than 1 second). Other averted glances can vary by up to 3 seconds.

Natural human gaze behavior varies from person to person as well, and a cultural model can take this into account so that the end result feels natural and not completely predictable. More precise cultural models for different cultures can be established by observing human interaction in video conferencing or other computer mediated situations. Appropriateness in non-verbal behavior may also differ depending on the medium.

In step 404, when the behavioral state is determined to be inappropriate, a signal for changing the output can be sent to the next module. The task of this module is to modify the output stream, whether it is stream to the local video display or a transmission signal directed to the remote participant. In one embodiment, the first step to modifying the output stream is to determine an alternative behavior. Again, the cultural model and the recent history/state can play a role here. The alternative behavior should preferably fit within the context of the meeting as well as the culture.

In various embodiments, there can be several approaches to changing the output stream shown in step 404. These approaches can differ depending on the particular setting. For example, as previously described, in a three-dimensional environment, all aspects of the avatar may be programmatically adjusted, as needed. A sequence of commands can be designed to cover a sufficient period of time for displaying culturally appropriate behavior. In a video conference, it can be more difficult to control larger body movements such as gestures or a wide range of facial expression. It is possible to modify the video stream with a smaller number of critical expressions such as participants' eye gaze. Sequences of the participants' eyes looking in different directions can be collected during the calibration of the eye tracking device. This calibration can be integrated with the procedure for setting up and receiving a video conference call, or based on recognizing the participants using a previously trained face detection and recognition algorithm. From these sequences, the area around the eyes can be extracted and reused for modifying the video stream. More information on face detection and recognition can be found in the following references, which are incorporated herein by reference:

Schneiderman, et al. "A Statistical Model for 3D Object Detection Applied to Faces and Cars" In *Proceedings of IEEE Conference on Computer Vision and Pattern Recognition* (2000); and Tsalakanidou, et al. "Face localization and authentication using color and depth images" IEEE Transactions on Image Processing 14(2), (2005) pp. 152-168.

In some embodiments, a simpler alternative is to simply shift the view of the participants to a view of some shared material such as PowerPoint slides, when the behavior of the participant is inappropriate. At the same time, an off-screen display or other indicator may be used to suggest to the participant how to modify his behavior to be more appropriate.

In step 406, after a certain period of time, the view can return to the normal unmodified view. The appropriate time to return to this view can be determined in the same way as deciding when to modify this view. However, when alternative visual material to the video stream is shown, the system should also consider how long a time the alternative visual material has been shown.

In step 408, the process can be repeated as needed, starting with step 400. Appropriate modules of the conferencing system can be programmed by a programmer/developer to perform the functions in each step illustrated in the figure. By implementing the methodology illustrated herein, a smoother and more culturally appropriate video conferencing experience is enabled for the user.

Figure 4B:
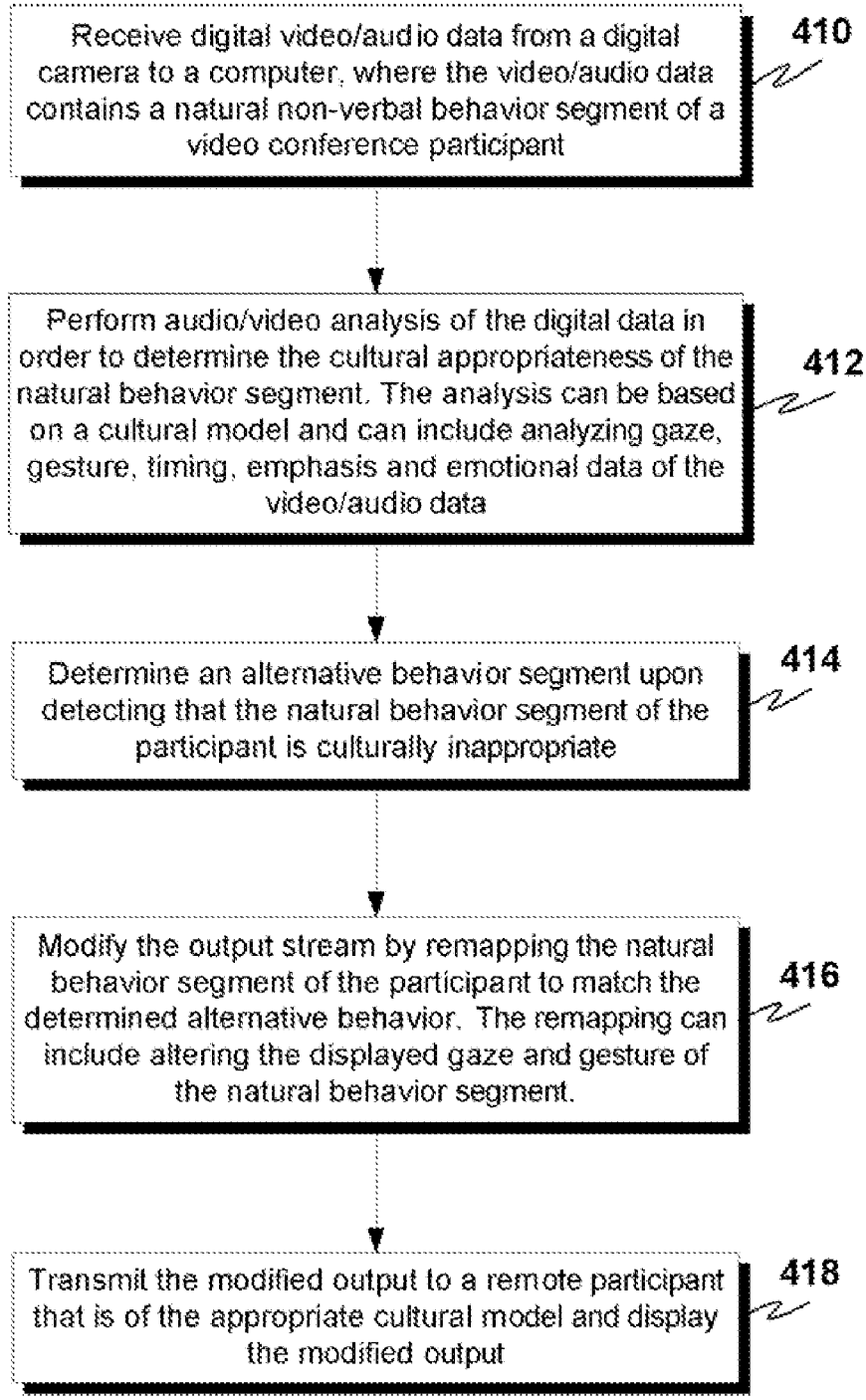
FIG. 4B is a process flow chart of an embodiment in accordance with the methods described herein.

FIG. 4B is a process flow chart of an embodiment in accordance with the methods described herein. Although this figure depicts functional steps in a particular sequence for purposes of illustration, the process is not necessarily limited to this particular order or steps. One skilled in the art will appreciate that the various steps portrayed in this figure can be changed, rearranged, performed in parallel or adapted in various ways. Furthermore, it is to be understood that certain steps or sequences of steps can be added to or omitted from this process, without departing from the spirit and scope of the invention.

As shown in step 410, the method can begin with receiving a video image data from a digital camera. The video image data can include a natural non-verbal behavior segment of at least one participant to the conference. This video image data is transmitted between the users of the conference system.

In step 412, a video analysis can be performed of the video image data in order to determine the cultural appropriateness of the behavior segment. In one embodiment, the video analysis includes analyzing any one or more of: gaze, gesture, timing, emphasis and emotion of the natural non-verbal behavior segment according to a cultural model. In various embodiments, the analysis also considers the current state as well as previous history of the conversation and of the user's actions. In various embodiments, the analysis is performed by a software module deployed on a computing device.

In some cases, the non-verbal behavior of the participant will be deemed inappropriate in view of the cultural model. Thus, in step 414, an alternative behavior can be determined upon detecting that the natural non-verbal behavior segment of the participant is culturally inappropriate. In one embodiment, the alternative behavior is also calculated according to the cultural model and/or the history and state of the session being carried on.

In step 416, the output stream can be modified by remapping the natural non-verbal behavior segment of the participant to match the determined alternative behavior. The remapping can include altering any combination of the gaze and gesture of the user's non-verbal behavior segment. The modification can include changing the appearance of the user's avatar or direct manipulation of an actual video signal.

Figure 5:
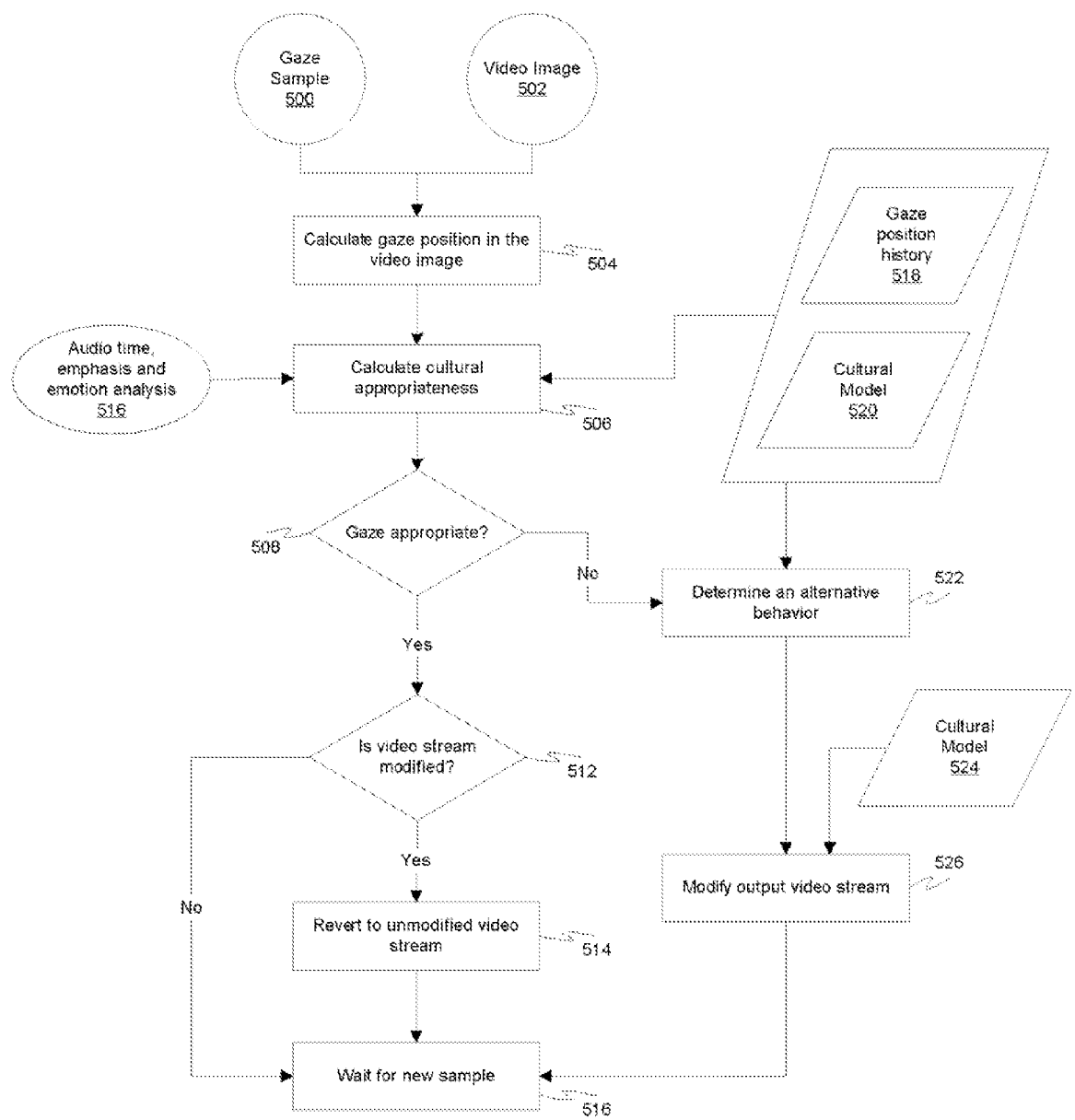
FIG. 5 illustrates a logical flow chart diagram of a process for modifying gaze in accordance with the embodiments described herein.

FIG. 5 illustrates a logical flow chart diagram of a process for modifying gaze in accordance with the embodiments described herein. Although this figure depicts functional steps in a particular sequence for purposes of illustration, the process is not necessarily limited to this particular order or steps. One skilled in the art will appreciate that the various steps portrayed in this figure can be changed, rearranged, performed in parallel or adapted in various ways. Furthermore, it is to be understood that certain steps or sequences of steps can be added to or omitted from this process, without departing from the spirit and scope of the invention.

The process shown can begin with receiving a gaze sample 500 and a video image data to the video conferencing system. In various embodiments, the video image data can come from a digital camera in communication with a computing device, such as via a universal serial bus (USB) interface. The gaze sample can be previously recorded and stored in memory and can be used to modify the actual video image of the user when it is so determined.

In step 504, the gaze position can be calculated in the video image. In one embodiment, an eye-tracking software or device can be used to accomplish this task. Once the position is determined, the system can proceed to calculate the cultural appropriateness 506 of the user's gaze. In one embodiment, the cultural analysis can take into account the gaze position history data 518 and the cultural model 520. For example, in accordance with certain cultural models, it may be determined that the gaze downwards should not exceed more than a specified period of time. By comparing the gaze position history to the current calculated gaze position, the system can calculate the appropriateness of the user's actions in light of the cultural model. In various alternative embodiments, time, emphasis and emotion analysis can also be performed on the audio collected from the user, as shown in step 516.

If the gaze position is deemed inappropriate 508, the system can determine an alternative behavior for the user, as shown in step 522. Once the alternative behavior is calculated, the output stream can be modified accordingly, as shown in step 526. In one embodiment, the cultural model data 524 can be used to modify the stream, such as by splicing a selected culturally appropriate gaze sample onto the video signal. Once the video is modified, the system can remain in idle state waiting for new video input data, as shown in step 516.

If the gaze position is deemed appropriate, the system can determine whether the current video stream is being modified in step 512. If the stream is being modified, the system can return to an unmodified version of the video (step 514), since the user's actions are no longer considered inappropriate. If the stream is not being modified, no further action is necessary and the system can wait for the next input. In various embodiments, the process illustrated in FIG. 5 can be continuously and repeatedly executed as the video teleconference is being carried on. Alternatively, the process for evaluating and modifying the user's gaze can be enabled/disabled as needed by the user(s).

Various embodiments of the invention described above include a computer program product that is a storage medium (media) having instructions stored thereon/in which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, micro drives, magneto-optical disks, holographic storage, ROMs, RAMs, PRAMS, EPROMs, EEPROMs, DRAMs, VRAMs, flash memory devices, magnetic or optical cards, nanosystems (including molecular memory ICs); paper or paper-based media; and any type of media or device suitable for storing instructions and/or information.

Various embodiments include a computer program product that can be transmitted in whole or in parts and over one or more public and/or private networks wherein the transmission includes instructions which can be used by one or more processors to perform any of the features presented herein. In various embodiments, the transmission may include a series of multiple and separate transmissions.

Stored one or more of the computer readable medium (media), the present disclosure includes software for controlling both the hardware of general purpose/specialized computer(s) and/or processor(s), and for enabling the computer(s) and/or processor(s) to interact with a human user or other mechanism utilizing the results of the present invention. Such software may include, but is not limited to, device drivers, operating systems, execution environments/containers, user interfaces and applications.

The foregoing description of the embodiments of the present invention has been provided for purposes of illustration and description. It is not intended to be exhaustive or to limit the invention to the precise forms disclosed. Many modifications and variations can be apparent to the practitioner skilled in the art. Embodiments were chosen and described in order to best explain the principles of the invention and its practical application, thereby enabling others skilled in the relevant art to understand the invention. It is intended that the scope of the invention be defined by the following claims and their equivalents.

What is claimed is:

1. A method for modifying computer mediated communications, the method comprising:
   at a computer system including one or more processors and memory:
      receiving input video data from a digital camera, the input video data including a first segment of the input video data corresponding to recorded non-verbal behavior of a first participant in a computer mediated communication;
      generating a first portion of an output stream of video data, wherein generating the first portion of the output stream of video data includes:
         comparing the recorded non-verbal behavior to a predefined behavioral model, wherein the behavioral model defines behavioral parameters; and
         in accordance with a determination that the recorded non-verbal behavior is inconsistent with the behavioral model, determining alternative behavior that is consistent with the behavioral model; and
         including the alternative behavior in the first portion of the output stream of video data in place of behavior representative of the recorded non-verbal behavior in the respective video segment; and
      transmitting the output stream of video data to a second participant in the computer mediated communication.

2. The method of claim 1 wherein receiving the input video further includes:
   tracking gaze behavior of the first participant using an eye-tracking mechanism.

3. The method of claim 1 wherein including the alternative behavior in the first portion of the output stream further includes:
   modifying a digital avatar of the first participant to show the alternative behavior.

4. The method of claim 1 wherein including the alternative behavior in the first portion of the output stream further includes:
   replacing a portion of the first segment of the input video data with pre-recorded video of the first participant that includes the alternative behavior.

5. The method of claim 1 wherein comparing the recorded non-verbal behavior to a predefined behavioral model further includes:
   calculating a gaze position history of the first participant by analyzing behavior of the first participant in previous segments of the input video.

6. The method of claim 5 wherein comparing the recorded non-verbal behavior to a predefined behavioral model further includes:
   estimating likely future behavior of the first participant based on the behavior of the first participant in previous segments of the input video.

7. The method of claim 1, further comprising, after transmitting the first portion of the output stream to the second participant:
   comparing subsequent recorded non-verbal behavior in a second segment of the input video data to the behavioral model; and
   in accordance with a determination that the subsequent recorded non-verbal behavior is consistent with the behavioral model, transmitting, to the second participant, a second portion of the output stream based on the second segment of video image, wherein the second portion of the output stream includes behavior representative of the subsequent recorded non-verbal behavior.

8. The method of claim 1, wherein, the behavioral parameters include one or more of: direction of gaze while speaking, direction of gaze while listening, direction of gaze while thinking, and duration of gaze in a predefined direction.

9. A computer system, comprising:
   a digital camera;
   one or more processors;
   memory;
   one or more programs, wherein the one or more programs are stored in the memory and configured to be executed by the one or more processors, the one or more programs including instructions for:
      receiving input video data from the digital camera, the input video data including a first segment of the input video data corresponding to recorded non-verbal behavior of a first participant in a computer mediated communication;
      generating a first portion of an output stream of video data, wherein generating the first portion of the output stream of video data includes:
         comparing the recorded non-verbal behavior to a predefined behavioral model, wherein the behavioral model defines behavioral parameters; and in accordance with a determination that the recorded non-verbal behavior is inconsistent with the behavioral model, determining alternative behavior that is consistent with the behavioral model; and including the alternative behavior in the first portion of the output stream of video data in place of behavior representative of the recorded non-verbal behavior in the respective video segment; and transmitting the output stream of video data to a second participant in the computer mediated communication.

10. The system of claim 9, further comprising:
an eye-tracking mechanism that tracks gaze behavior of the first participant.

11. The system of claim 9 wherein including the alternative behavior in the first portion of the output stream further includes:
modifying a digital avatar of the first participant to show the alternative behavior.

12. The system of claim 9 wherein including the alternative behavior in the first portion of the output stream further includes:
replacing a portion of the first segment of the input video data with pre-recorded video of the first participant that includes the alternative behavior.

13. The system of claim 9 wherein comparing the recorded non-verbal behavior to a predefined behavioral model further includes:
calculating a gaze position history of the first participant by analyzing behavior of the first participant in previous segments of the input video.

14. The system of claim 13 wherein comparing the recorded non-verbal behavior to a predefined behavioral model further includes:
estimating likely future behavior of the first participant based on the behavior of the first participant in previous segments of the input video.

15. The system of claim 9, wherein the one or more programs further comprise instructions for, after transmitting the first portion of the output stream to the second participant:
comparing subsequent recorded non-verbal behavior in a second segment of the input video data to the behavioral model; and
in accordance with a determination that the subsequent recorded non-verbal behavior is consistent with the behavioral model, transmitting, to the second participant, a second portion of the output stream based on the second segment of video image, wherein the second portion of the output stream includes behavior representative of the subsequent recorded non-verbal behavior.

16. The system of claim 9, wherein, the behavioral parameters include one or more of: direction of gaze while speaking, direction of gaze while listening, direction of gaze while thinking, and duration of gaze in a predefined direction.

17. A non-transitory computer readable storage medium storing one or more programs, the one or more programs comprising instructions, which when executed by a computer system with one or more processors, cause the computer system to:
receive input video data from a digital camera, the input video data including a first segment of the input video data corresponding to recorded non-verbal behavior of a first participant in a computer mediated communication;
generate a first portion of an output stream of video data, wherein generating the first portion of the output stream of video data includes:
comparing the recorded non-verbal behavior to a predefined behavioral model, wherein the behavioral model defines behavioral parameters; and
in accordance with a determination that the recorded non-verbal behavior is inconsistent with the behavioral model, determining alternative behavior that is consistent with the behavioral model; and
including the alternative behavior in the first portion of the output stream of video data in place of behavior representative of the recorded non-verbal behavior in the respective video segment; and
transmit the output stream of video data to a second participant in the computer mediated communication.

18. The non-transitory computer readable storage medium of claim 17, wherein the one or more programs further comprise instructions which cause the computer system to, after transmitting the first portion of the output stream to the second participant:
compare subsequent recorded non-verbal behavior in a second segment of the input video data to the behavioral model; and
in accordance with a determination that the subsequent recorded non-verbal behavior is consistent with the behavioral model, transmit, to the second participant, a second portion of the output stream based on the second segment of video image, wherein the second portion of the output stream includes behavior representative of the subsequent recorded non-verbal behavior.

19. The non-transitory computer readable storage medium of claim 17, wherein, the behavioral parameters include one or more of: direction of gaze while speaking, direction of gaze while listening, direction of gaze while thinking, and duration of gaze in a predefined direction.

* * * * *